US011826857B2

(12) United States Patent
Yasutomi et al.

(10) Patent No.: US 11,826,857 B2
(45) Date of Patent: Nov. 28, 2023

(54) STEEL SHEET AND MEMBER

(71) Applicant: NIPPON STEEL CORPORATION, Tokyo (JP)

(72) Inventors: Takashi Yasutomi, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 258 days.

(21) Appl. No.: 17/436,000

(22) PCT Filed: Mar. 26, 2020

(86) PCT No.: PCT/JP2020/013523
§ 371 (c)(1),
(2) Date: Sep. 2, 2021

(87) PCT Pub. No.: WO2020/196701
PCT Pub. Date: Oct. 1, 2020

(65) Prior Publication Data
US 2022/0143760 A1 May 12, 2022

(30) Foreign Application Priority Data

Mar. 26, 2019 (JP) .................................. 2019-057608

(51) Int. Cl.
*B23K 103/04* (2006.01)
*C21D 9/50* (2006.01)
(Continued)

(52) U.S. Cl.
CPC .............. *B23K 33/00* (2013.01); *B23K 31/02* (2013.01); *B23K 2103/04* (2018.08); *C21D 9/50* (2013.01)

(58) Field of Classification Search
CPC ............................ C21D 9/50; B23K 2103/04
See application file for complete search history.

(56) References Cited

U.S. PATENT DOCUMENTS

2017/0080475 A1   3/2017   Matsuno et al.

FOREIGN PATENT DOCUMENTS

JP    H0987737 A  *  3/1997
JP    4577811 B       9/2010
(Continued)

OTHER PUBLICATIONS

English translation of JPH0987737A, Yamamoto et al., EPO espacenet obtained Jun. 17, 2023 (Year: 2023).*

(Continued)

*Primary Examiner* — Adam Krupicka
(74) *Attorney, Agent, or Firm* — Birch, Stewart, Kolasch & Birch, LLP

(57) ABSTRACT

This steel sheet is a steel sheet (100) formed by causing end surfaces of a first sheet material (111) and a second sheet material (113) to abut each other in an in-plane direction and welding the first sheet material (111) and the second sheet material (113) via a strip-shaped welded part (115), and in which a softened part (120) that is softened more than other parts in the welded part (115) is formed in at least a part of the welded part (115), and on a first end surface of the steel sheet in which an end part of the welded part (115) in a longitudinal direction is formed, a region in which the softened part (120) is not formed is provided in at least a part of the end part of the welded part (115) in the longitudinal direction, and a maximum value of a depth of the softened part (120) in a sheet thickness direction is, as a ratio to a sheet thickness of the steel sheet (100), 50% or less.

9 Claims, 13 Drawing Sheets

(51) Int. Cl.
    *B23K 33/00*     (2006.01)
    *B23K 31/02*     (2006.01)

(56)     References Cited

FOREIGN PATENT DOCUMENTS

| | | | |
|---|---|---|---|
| JP | 2017189781 A | * | 10/2017 |
| WO | WO 2015/170707 A1 | | 11/2015 |

OTHER PUBLICATIONS

English translation of JP2017189781A, Miyazaki et al., EPO espacenet obtained Jun. 17, 2023 (Year: 2023).*
Barnes S J et al: "Residual strains and microstructure development in single and sequential double sided friction stir welds in RQT-701 steel", Materials Science and Engineering A, Elsevier, Amsterdam, NL, vol. 492, No. 1-2, Sep. 25, 2008 (Sep. 25, 2008), pp. 35-44.
Wang Z D et al: "Effect of ultra-sonic peening on laser-arc hybrid welded NV E690 steel", Journal of Laser Applications, American Institute of Physics, 2 Untington Quadrangle, Melville, NY 11747, vol. 30, No. 3, Jun. 12, 2018.

* cited by examiner

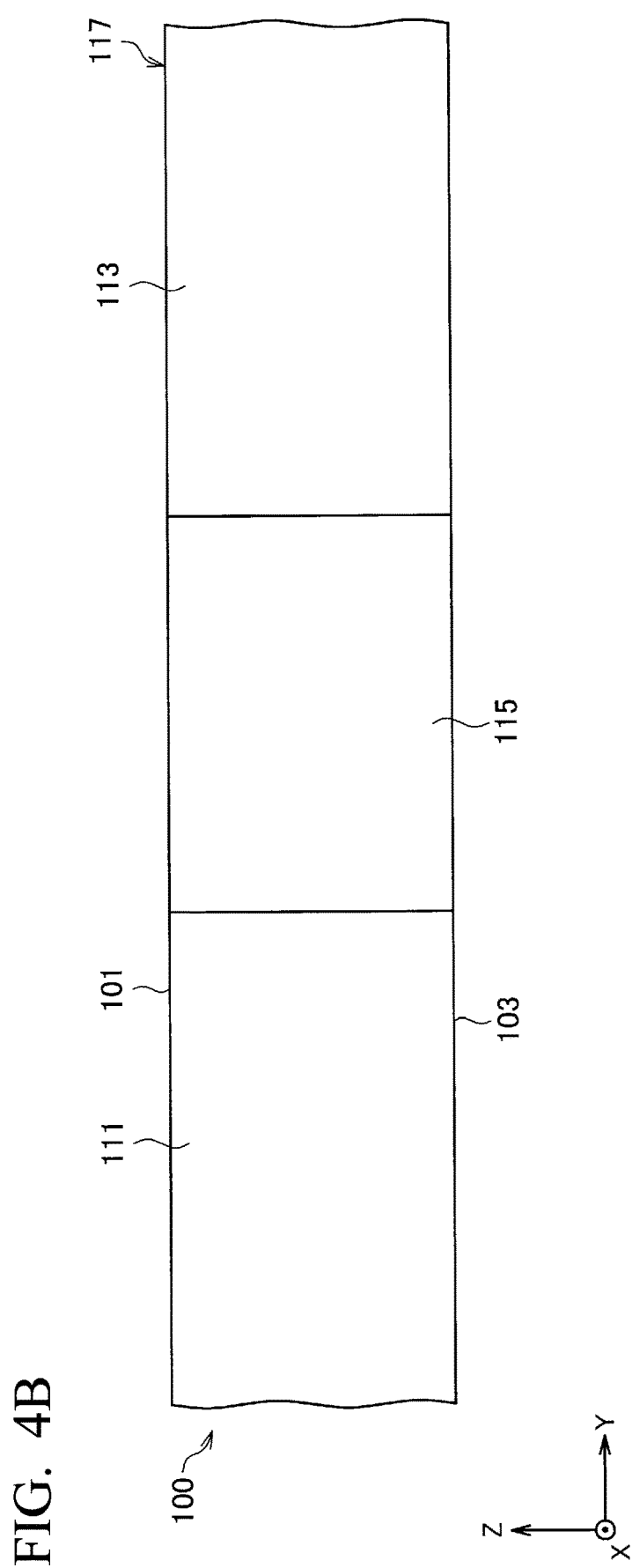

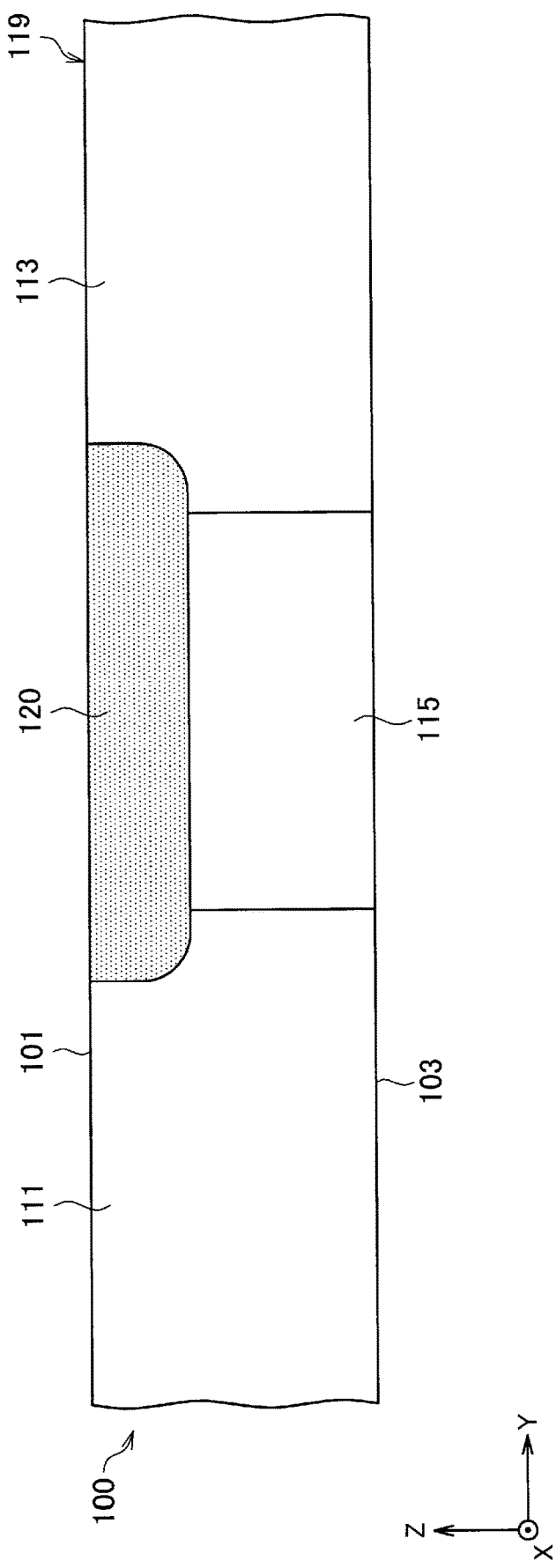

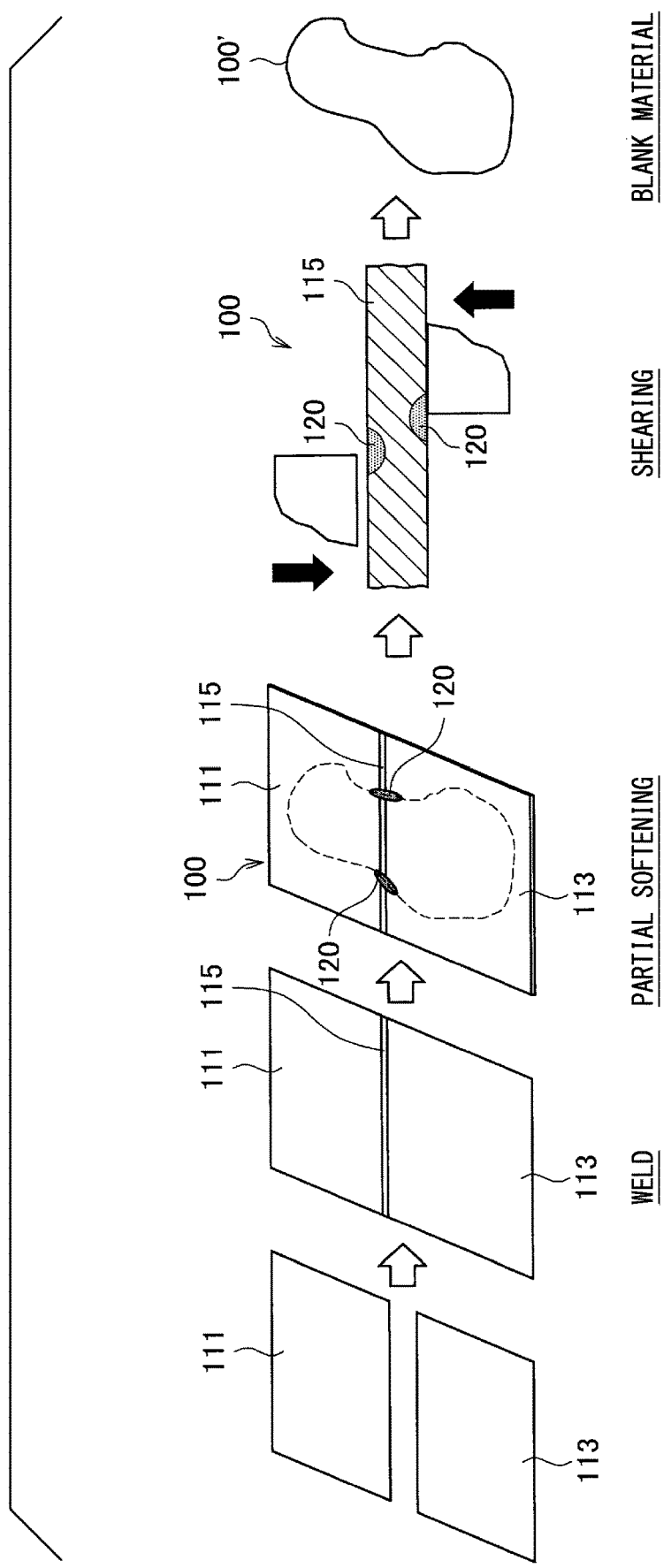

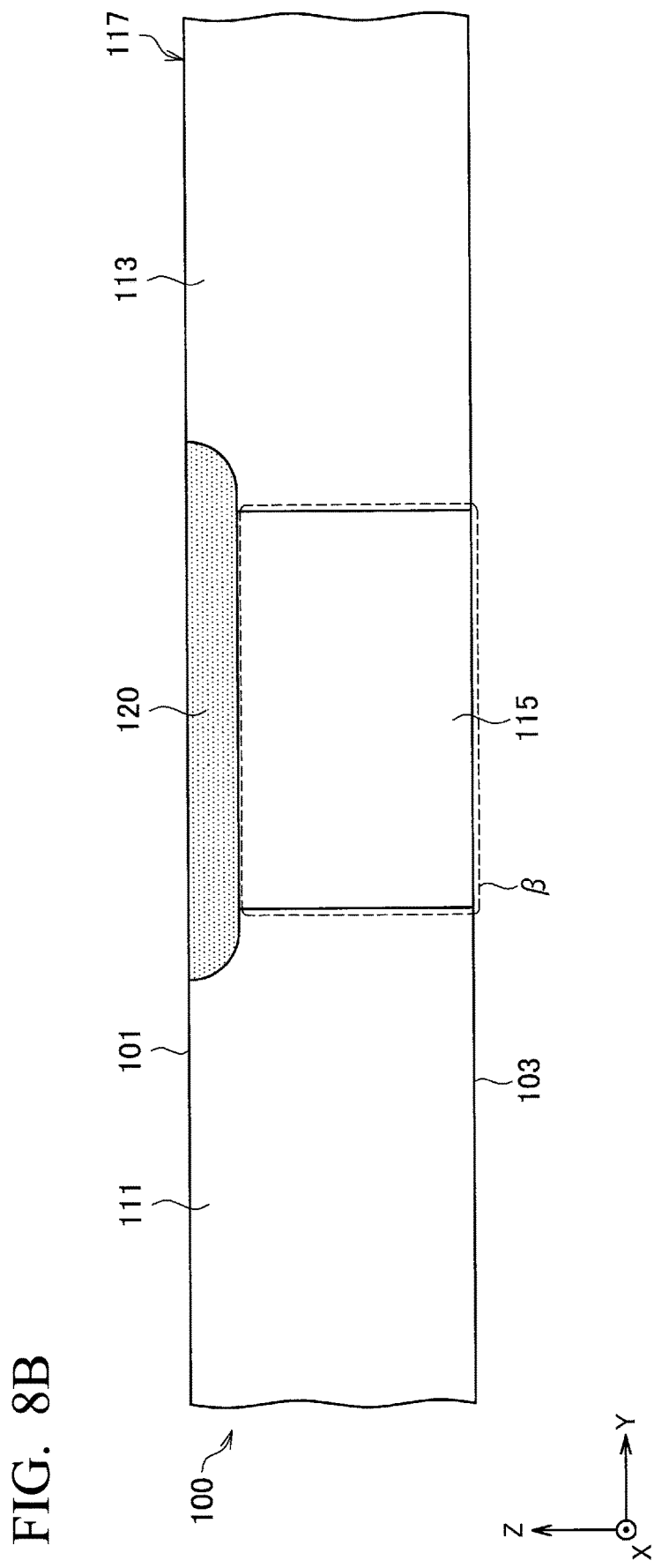

STEEL SHEET AND MEMBER

TECHNICAL FIELD

The present invention relates to a steel sheet and a member.

Priority is claimed on Japanese Patent Application No. 2019-057608, filed Mar. 26, 2019, the content of which is incorporated herein by reference.

BACKGROUND ART

When a steel sheet is subjected to various types of processing to form a blank having a predetermined shape, the steel sheet may be subjected to various treatments to adjust properties and functions of the steel sheet.

The following Patent Document 1 describes a technology for shearing a steel sheet to cut out a blank having a predetermined shape.

CITATION LIST

Patent Document

[Patent Document 1]
PCT International Publication No. WO 2015/170707

SUMMARY OF THE INVENTION

Problems to be Solved by the Invention

However, the technology described in Patent Document 1 is based on the premise that a single steel sheet is subjected to shearing. Therefore, there is a problem that the influence caused when a steel sheet formed by welding a plurality of sheet materials is sheared in a range including a welded part is not considered. In particular, there is a problem that the influence on productivity in shearing of the welded steel sheet is not considered.

The present invention has been made in view of the above problems, and an object of the present invention is to provide a novel and improved steel sheet and member that can improve productivity including that of a shearing process for a welded steel sheet.

Means for Solving the Problem (1) According to an aspect of the present invention, there is provided a steel sheet formed by causing end surfaces of a first sheet material and a second sheet material to abut each other in an in-plane direction and welding the first sheet material and the second sheet material via a strip-shaped welded part, in which a softened part that is softened more than other parts in the welded part is formed in at least a part of the welded part, in which, on a first end surface of the steel sheet in which an end part of the welded part in a longitudinal direction is formed, a region in which the softened part is not formed is provided in at least a part of the end part of the welded part in the longitudinal direction, and in which a maximum value of a depth of the softened part in a sheet thickness direction, as a ratio to a sheet thickness of the steel sheet, is 50% or less.

(2) In the steel sheet according to (1), at least one of the first sheet material and the second sheet material may be a steel material having a tensile strength of 1,180 MPa or more.

(3) In the steel sheet according to (1), at least one of the first sheet material and the second sheet material may be a steel material having a tensile strength of 1,310 MPa or more.

(4) In the steel sheet according to any one of (1) to (3), a Vickers hardness of the softened part may be 90% or less with respect to a Vickers hardness of other parts in the welded part.

(5) In the steel sheet according to any one of (1) to (4), the maximum value of the depth of the softened part in the sheet thickness direction, as a ratio to a sheet thickness of the steel sheet, may be 30% or less.

(6) In the steel sheet according to any one of (1) to (5), the maximum value of the depth of the softened part in the sheet thickness direction, as a ratio to a sheet thickness of the steel sheet, may be 10% or less.

(7) In the steel sheet according to any one of (1) to (6), the softened parts may be provided on the side of a first surface of the steel sheet and on the side of a second surface opposite to the first surface.

(8) In the steel sheet according to any one of (1) to (7), the softened parts may be provided such that they are side by side with each other, and a first position at which the depth of the softened part provided on the side of the first surface of the steel sheet in the sheet thickness direction is a maximum and a second position at which the depth of the softened part provided on the side of the second surface of the steel sheet in the sheet thickness direction is a maximum may be different from each other in a direction orthogonal to the sheet thickness direction of the softened part on a sheet surface of the steel sheet.

(9) According to another aspect of the present invention, there is provided a member, including: a first part; a second part; and a welded part in which the first part and the second part are caused to abut in an in-plane direction and welded, in which a softened part that is softened more than other parts in the welded part is formed in at least a part of the welded part, in which a region in which the softened part is not formed is provided in at least a part of an end part of the welded part of the member in a longitudinal direction, and in which, on a second end surface in which an end part of the welded part in the longitudinal direction is formed, an average value of Vickers hardnesses at a distance of 80 μm from the second end surface is a value that is higher than an average value of Vickers hardnesses at a distance of 300 μm from the second end surface by at least 10%.

Effects of the Invention

As described above, according to the present invention, there is provided a novel and improved steel sheet that can improve productivity including that of a shearing process for a welded steel sheet.

BRIEF DESCRIPTION OF DRAWINGS

FIG. 4B is a side view of a steel sheet before shearing is performed on a welded part according to the same embodiment.

FIG. 5B is a side view illustrating a shape of a welded part according to the same embodiment after shearing.

FIG. 7 is a diagram illustrating an example of a method of producing a steel sheet according to the same embodiment.

FIG. 8B is a side view showing another example of the steel sheet according to the same embodiment.

EMBODIMENT(S) OF THE INVENTION

Figure 1:
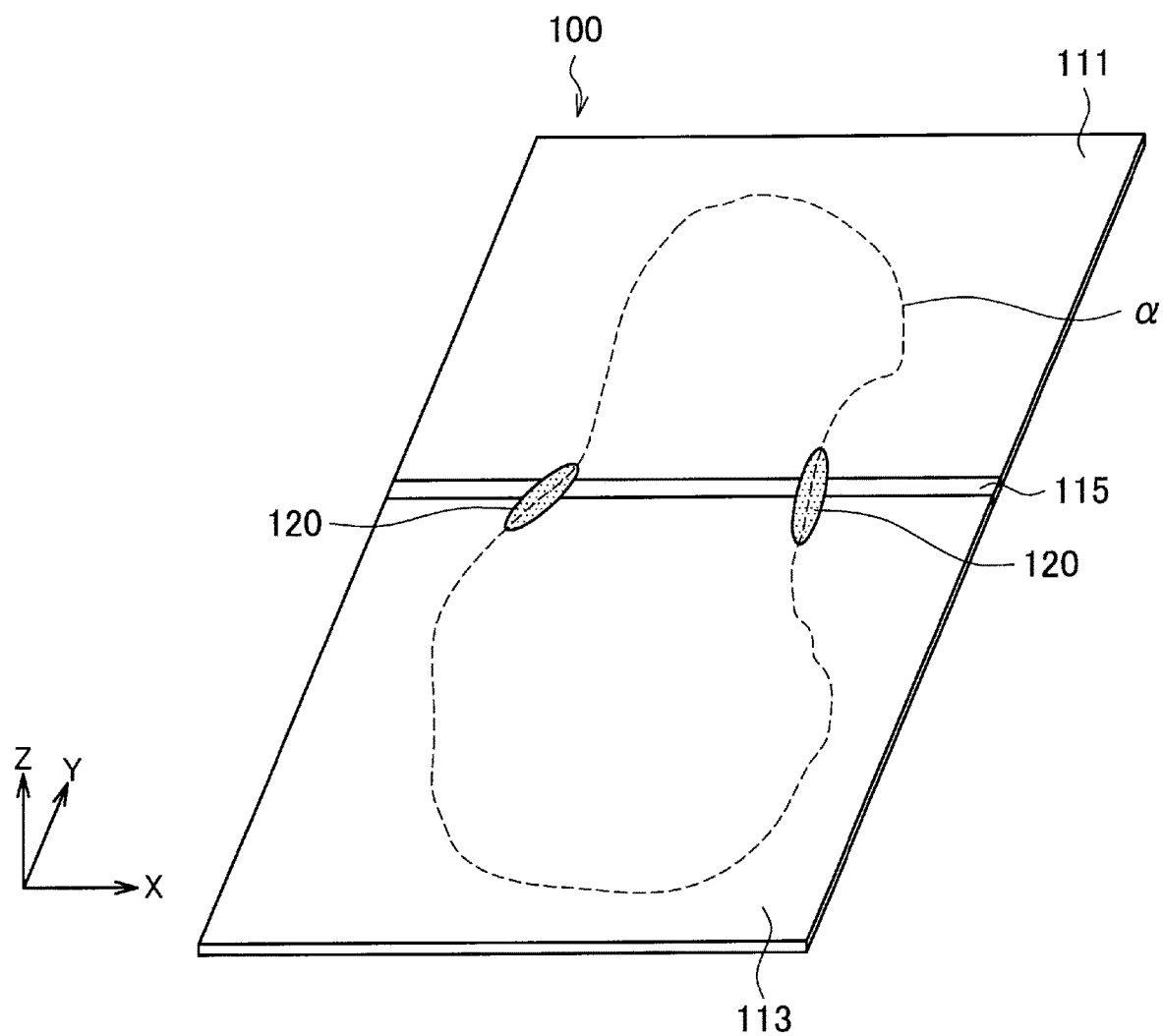
FIG. 1 is a perspective view showing a steel sheet according to one embodiment of the present invention.

Hereinafter, preferable embodiments of the present invention will be described in detail with reference to the appended drawings. Here, in this specification and drawings, components having substantially the same functional configuration are denoted with the same reference numerals and redundant descriptions thereof are omitted.

EMBODIMENT

[Schematic Configuration of Steel Sheet]

Figure 2:
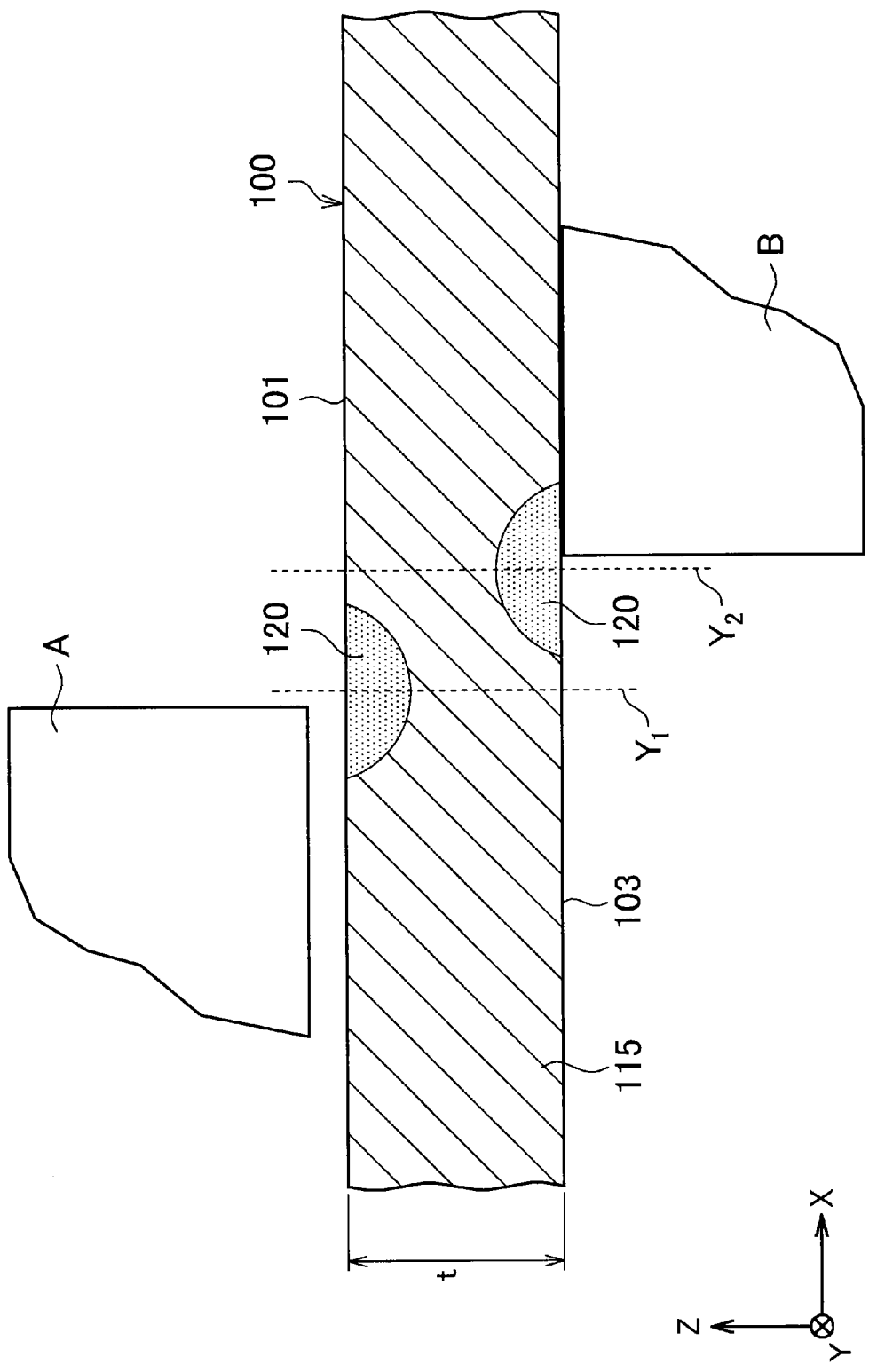
FIG. 2 is a partial cross-sectional view showing an example of a state of shearing on a steel sheet according to the same embodiment.

First, with reference to FIG. 1 and FIG. 2, a schematic configuration of a steel sheet according to one embodiment of the present invention is described. FIG. 1 is a perspective view showing an example of a steel sheet 100 according to the present embodiment. FIG. 2 is a partial cross-sectional view showing an example of a state of shearing on the steel sheet 100 according to the present embodiment. As shown in FIG. 1, the steel sheet 100 is a flat member. When the steel sheet 100 is sheared, a blank (corresponding to a blank 100' illustrated in FIG. 7), which is a sheet material having a predetermined shape, is cut out from the steel sheet 100. The blank is additionally subjected to various types of processing and treatments and formed into a formed product having a predetermined shape.

As shown in FIG. 1, the steel sheet 100 is formed by causing end surfaces of a first sheet material 111 and a second sheet material 113 to abut each other in the in-plane direction and welding the first sheet material 111 and the second sheet material 113 via a strip-shaped welded part 115. The steel sheet 100 is an example of a so-called tailored blank (TB) or tailored welded blank (TWB).

The welded part 115 is a strip-shaped region formed by melting and solidifying the first sheet material 111 and the second sheet material 113 with each other. The end part of the strip-shaped welded part 115 in the longitudinal direction is formed on the end surface (corresponding to a first end surface 117 to be described below in FIG. 4A and FIG. 4B) of the steel sheet 100. That is, the welded part 115 is formed over the steel sheet 100 in the width direction (X direction in the FIG. 1). The welded part 115 may be formed by a known welding technique such as laser welding and arc welding, and the forming method is not particularly limited.

At least one of the first sheet material 111 and the second sheet material 113 may be a steel material having a tensile strength of 1,180 MPa or more (or a steel material having a tensile strength of 1,180 MPa grade or more). In addition, at least one of the first sheet material 111 and the second sheet material 113 may be a steel material having a tensile strength of 1,310 MPa or more (or a steel material having a tensile strength of 1,310 MPa grade or more). In addition, the sheet thickness t of the first sheet material 111 or the second sheet material 113 may be, for example, 2 mm or less. In particular, the sheet thickness t of the first sheet material 111 or the second sheet material 113 may be, for example, about 1.6 mm.

In shearing on the steel sheet 100 according to the present embodiment, as shown in FIG. 1, along a predetermined scheduled cutting line α (refer to the dotted line in FIG. 1), the shearing tool comes in contact with the steel sheet 100. In this case, an end part of the shearing tool enters the steel sheet 100, and thus the load during shearing is likely to be concentrated on the end part. In particular, in the welded part 115, due to melting and solidification during welding, a structure which is mainly composed of a martensite structure and which is brittle and has relatively high strength may be formed. As a result, in the steel sheet 100, when a region including the welded part 115 is sheared, defects may occur in a part of the shearing tool. Specifically, during shearing on the region including the welded part 115, cracks in the welded part 115 may progress, and fracture may occur in the welded part 115 according to the rapid progress of cracks. Therefore, the energy required for shearing is rapidly released from the broken part, and the impact on the shearing tool during processing tends to increase. As a result, defects may occur in the shearing tool.

Here, the inventors conducted extensive studies, and as a result, found that in a case that at least a part of the welded part 115 of the steel sheet 100 is softened, the influence on the shearing tool during shearing is reduced. Hereinafter, the steel sheet 100 according to the present embodiment will be described in detail.

In the steel sheet 100 according to the present embodiment, at least a part of the welded part 115 has a softened part 120. The softened part 120 is a region that is partially formed in the welded part 115 of the steel sheet 100 and more softened than other parts of the welded part 115.

[Softened Part]

The softened part 120 is formed in the welded part 115 so that it includes at least a part of the position of the surface of the steel sheet 100 with which the end part of the shearing tool comes in contact in the sheet thickness direction during shearing. For example, as shown in FIG. 2, the steel sheet 100 is sheared by a pair of upper and lower shearing tools (a punch A and a die B). In this case, as shown in FIG. 2, the softened part 120 is formed so that it includes the position of the surface of the steel sheet 100 with which ends (edges) of the punch A and the die B come in contact. The distance (clearance) between the punch A and the die B may be, for example, 10% or less of the sheet thickness of the steel sheet 100.

In addition, as shown in FIG. 1, the softened part 120 is formed so that it includes at least a part of the welded part 115. In particular, the softened part 120 is formed so that it includes a part in which the welded part 115 and the scheduled cutting line a intersect.

The Vickers hardness of the softened part 120 is 90% or less of the Vickers hardness of the other region (a region excluding the softened part 120) of the welded part 115. When the Vickers hardness of the softened part 120 is 90% or less of the Vickers hardness of the other part, it is possible to reduce defects of the shearing tool.

As an example of the hardness of the welded part 115, a Vickers hardness of about 463 Hv may be exemplified. On the other hand, as an example of the hardness of the softened part 120, a Vickers hardness of about 180 Hv may be exemplified.

Hardness measurement conditions are as follows. In the welded part 115 of the steel sheet 100, a sample including the softened part 120 is collected, and a sample of the measurement surface is prepared, and subjected to a Vickers hardness test. The measurement surface is a surface parallel to the steel sheet 100 in the sheet thickness direction. A method of preparing a measurement surface is performed according to JIS Z 2244:2009. After the measurement surface is polished using #600 to #1500 silicon carbide paper, mirror finishing is performed using a liquid in which diamond powder particles having a particle size of 1 μm to 6 μm are dispersed in a diluting solution such as an alcohol or pure water. The Vickers hardness test is performed according to the method described in JIS Z 2244:2009. For the sample for which the measurement surface is prepared, the Vickers hardness is measured using a micro Vickers hardness tester at a test load of 0.98 N and a pitch of 0.05 mm.

Examples of methods of forming the softened part 120 include a method of performing softening by partially tempering using a known partial heating technique such as laser heating and high frequency heating. In addition, as another example, softening may be performed by partial tempering using a hot forming technique such as partial hot forming. The method of forming the softened part 120 may be a method other than tempering by heating as long as the hardness can be partially reduced. For example, a method of forming the softened part 120 may be a method such as partial decarburization.

The softened part 120 may be partially formed in the welded part 115, and the shape and size of the steel sheet 100 in a plan view are not particularly limited. For example, in a plan view, it may have a circular shape, an oval shape, a polygonal shape, a rounded square shape or the like. In addition, in a plan view of the steel sheet 100, the width (length in the short direction) of the softened part 120 may be 40 mm or less.

Figure 3:
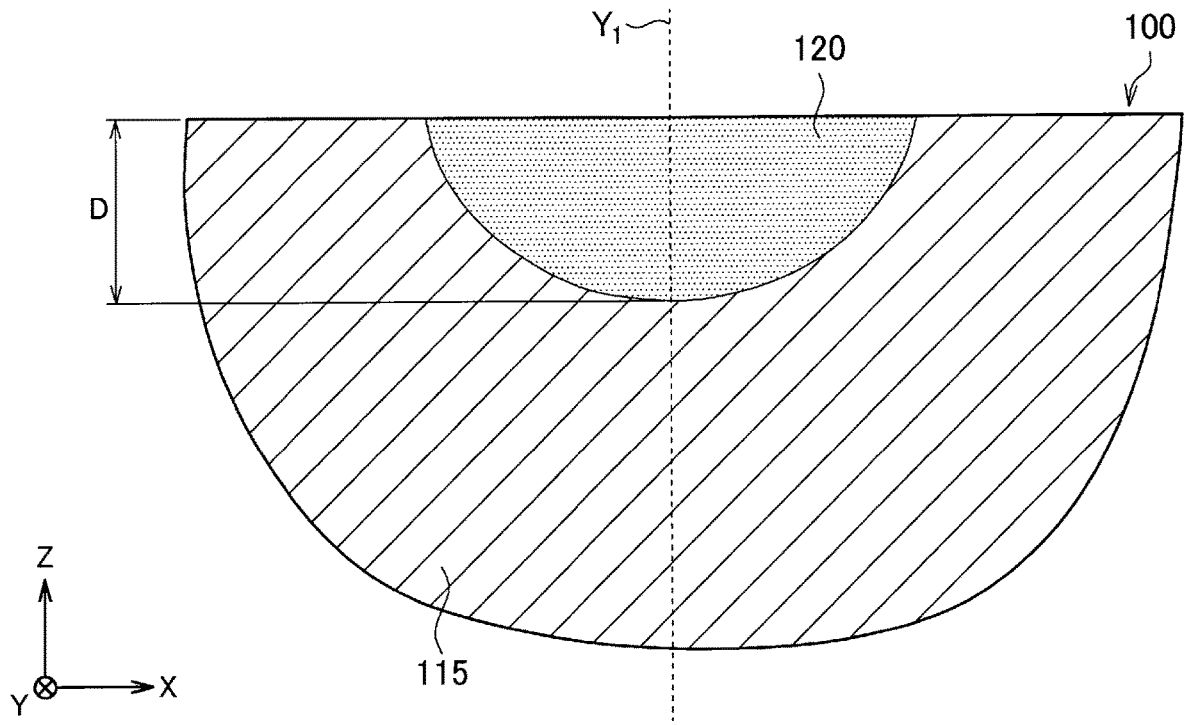
FIG. 3 is a partial cross-sectional view showing an example of a part in which a softened part according to the same embodiment is formed.

Subsequently, with reference to FIG. 1 to FIG. 3, the softened part 120 will be described. FIG. 3 is a partial cross-sectional view showing an example of a part in which the softened part 120 is formed. As shown in FIG. 3, the softened part 120 may be formed so that it has a predetermined depth D in the steel sheet 100 in the sheet thickness direction. The depth D of the softened part 120 is determined as a distance from the outermost surface of the steel sheet 100 in a region in which the hardness measured under the above hardness measurement conditions is a predetermined value with respect to the other part of the welded part 115.

Specifically, the maximum value of the depth of the softened part 120 in the sheet thickness direction may be set to be as a ratio to the sheet thickness t of the steel sheet 100 that is 50% or less. In particular, the maximum value of the depth of the softened part 120 in the sheet thickness direction may be set to be as a ratio to the sheet thickness t of the steel sheet 100 that is 30% or less. In addition, in particular, the maximum value of the depth of the softened part 120 in the sheet thickness direction may be set to be as a ratio to the sheet thickness t of the steel sheet 100 that is 10% or less.

When the softened part 120 has a predetermined depth, since the region of the softened part 120 is secured in the sheet thickness direction of the steel sheet 100, it is possible to reduce defects of the tool during shearing and it is possible to sufficiently secure the formability and collision characteristics of the member after shearing.

Here, the softened part 120 may be formed over the sheet thickness direction. Thereby, the softened part 120 is sufficiently secured and thus defects of the tool during shearing are reduced.

In addition, as shown in FIG. 2, the softened parts 120 may be provided on the side of a first surface 101 of the steel sheet 100 and on the side of a second surface 103 provided on the side opposite to the first surface respectively. Since the shearing tool comes in contact with both the first surface 101 and the second surface 103 of the steel sheet 100, the softened parts 120 are provided on both sides and thus defects of the tool during shearing are further reduced.

In addition, as shown in FIG. 3, in a cross-sectional view of the softened part 120 in the width direction, the softened part 120 has a position at which the depth D in the steel sheet 100 in the sheet thickness direction is a maximum value. In this case, as shown in FIG. 2, in the softened part 120 provided on the side of the first surface 101 of the steel sheet 100, the position at which the depth D in the sheet thickness direction is a maximum value is defined as a first position $Y_1$. In addition, in the softened part 120 provided on the side of the second surface 103 of the steel sheet 100, the position at which the depth D in the sheet thickness direction is a maximum value is defined as a second position $Y_2$. In addition, the softened part 120 on the side of the first surface 101 and the softened part 120 on the side of the second surface 103 are provided such that they are side by side with each other. In this case, as shown in FIG. 2, the first position $Y_1$ and the second position $Y_2$ are different positions in the longitudinal direction of the welded part 115. That is, the first position $Y_1$ and the second position $Y_2$ are provided at positions different from each other in the direction orthogonal to the sheet thickness direction of the steel sheet 100.

The first position $Y_1$ and the second position $Y_2$ of the softened parts 120 on the side of the first surface 101 and on the side of the second surface 103 are positions different from each other in the longitudinal direction of the welded part 115, and thus shearing is smoothly performed. As a result, defects of the shearing tool are further reduced.

[Relationship Between Softened Part and Sheared Part]

Figure 4A:
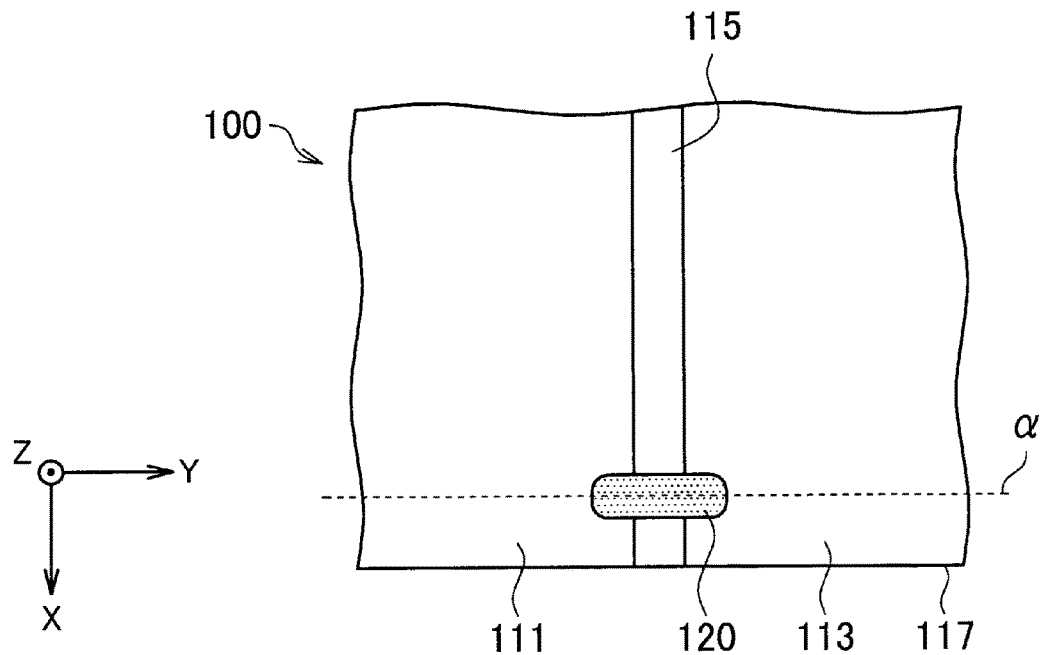
FIG. 4A is a plan view of a steel sheet before shearing is performed on a welded part according to the same embodiment.

Next, with reference to FIG. 4A and FIG. 4B, the state of shearing in the welded part 115 in which the softened part 120 is formed will be described. FIG. 4A is a plan view of the steel sheet 100 before shearing is performed on the welded part 115 according to the present embodiment. In addition, FIG. 4B is a side view of the steel sheet 100 before shearing is performed on the welded part 115 according to the present embodiment. As shown in FIG. 4A, the softened part 120 is formed in a part of the welded part 115 of the steel sheet 100. In addition, the softened part 120 is formed so that it includes a surface of a part in which the scheduled cutting line α for shearing the steel sheet 100 and the welded part 115 intersect.

In addition, as shown in FIG. 4B, the end part of the welded part 115 in the longitudinal direction (X direction) is formed on the first end surface 117 of the steel sheet 100. In a side view of the first end surface 117, on the first end surface 117, in a part in which the end part of the welded part 115 in the longitudinal direction is formed, the softened part 120 is not formed. Although details will be described below, on the first end surface 117 in which the end part of the welded part 115 of the steel sheet 100 is formed, there is a region in which the softened part 120 is not formed, and thus the productivity of shearing on the steel sheet 100 is further improved.

Figure 5A:
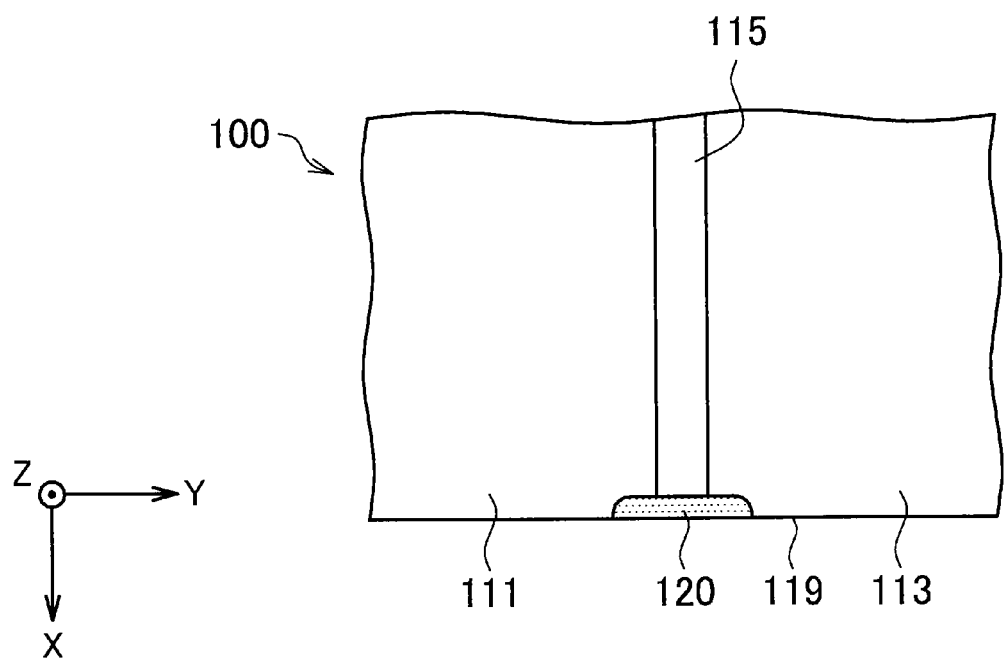
FIG. 5A is a plan view illustrating a shape of a welded part according to the same embodiment after shearing.
Figure 6:
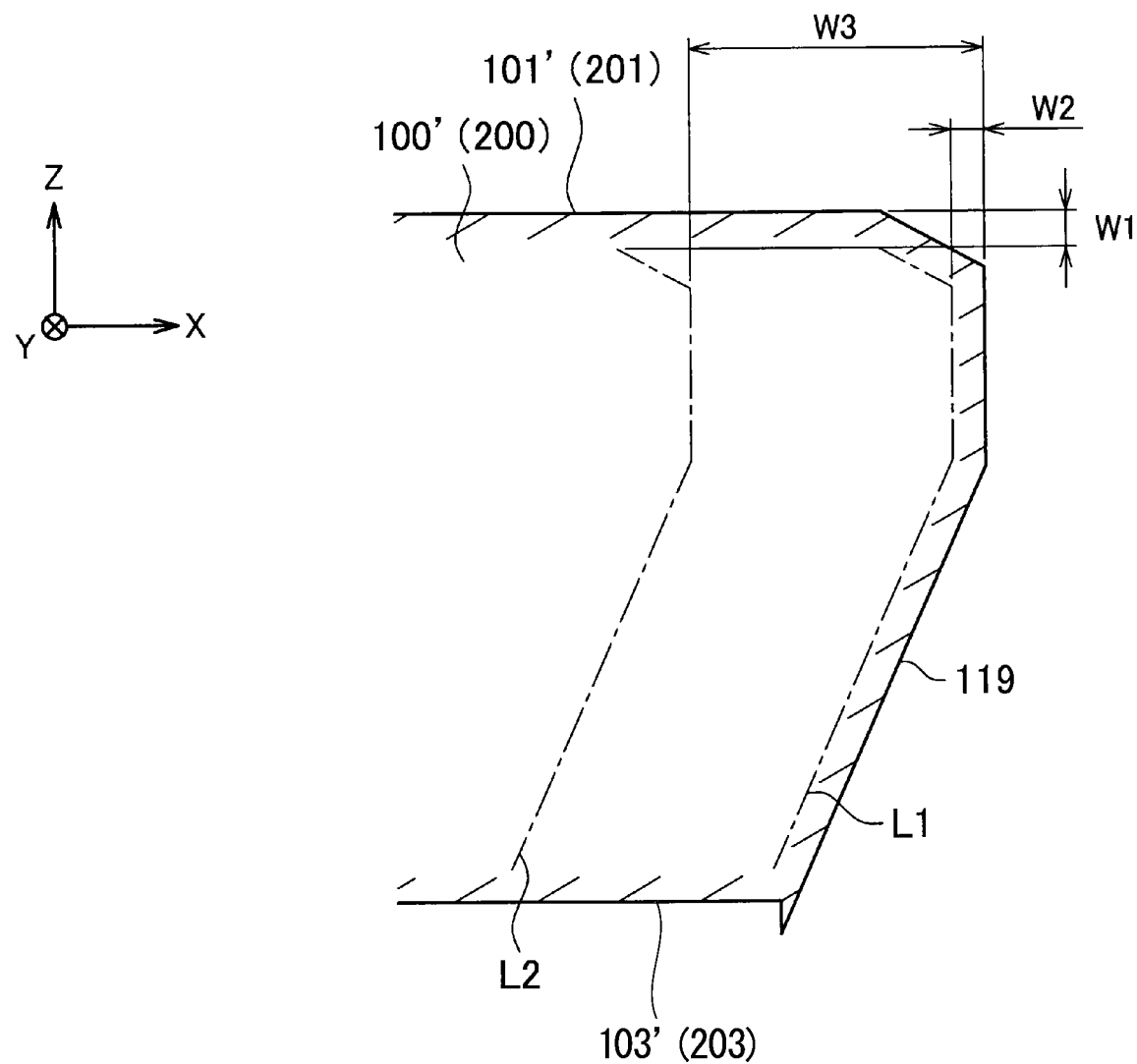
FIG. 6 is a cross-sectional view for illustrating a cross-sectional shape of a welded part according to the same embodiment after shearing.

Next, with reference to FIG. 5A, FIG. 5B, and FIG. 6, a second end surface 119 after shearing on the steel sheet 100 will be described. FIG. 5A is a plan view illustrating the shape of the welded part 115 according to the present embodiment after shearing. FIG. 5B is a side view illustrating the shape of the welded part 115 according to the present embodiment after shearing. FIG. 6 is a cross-sectional view for illustrating a cross-sectional shape of the welded part 115 according to the present embodiment after shearing. As shown in FIG. 5A, the steel sheet 100 is sheared along the scheduled cutting line a and the blank 100' is formed. As shown in FIG. 5B, the softened part 120 is formed so that it includes the position of the surface of the welded part 115. Thereby, during shearing, the shearing tool comes in contact with the softened part 120, and thus concentration of the load applied to the shearing tool is restrained. In addition, since the softened part 120 is formed in the welded part 115, the progress of cracks during shearing is inhibited, and rapid release of energy is inhibited. As a result, defects of the tool due to the impact on the shearing tool are reduced, the burden of maintenance and inspection operations such as tool replacement is reduced, and the productivity in the shearing process is improved.

Through the shearing as described above, the steel sheet 100 is formed as the blank 100', and then the blank 100' is subjected to various types of processing, and formed into a member 200 having a predetermined shape. As shown in FIG. 6, the blank 100', or the member 200 formed from the steel sheet 100 according to the present embodiment has a predetermined hardness change in the vicinity of the second end surface 119 (cut surface after shearing) in which the end part of the welded part 115 in the longitudinal direction is formed. That is, the steel sheet 100 has the softened part 120 so that it includes the welded part 115. Therefore, in the shearing on the welded part 115, shearing is smoothly performed, work hardening effectively occurs at the second end surface 119, and the hardness in the vicinity of the second end surface 119 is higher than that of the inside of the blank 100' or the member 200.

Specifically, as shown in FIG. 6, in the cross section of the steel sheet 100 formed in the blank 100' or the member 200 viewed in the width direction (Y direction in FIG. 6), the hardness in the vicinity of the second end surface 119 along the predetermined line L1 is measured. The start point of the line L1 is a position at a distance W1=80 μm from the side of the first surface 101' of the blank 100' (or a first surface 201 of the member 200) in the sheet thickness direction and a distance W2=80 μm from the second end surface 119. The line passing a position of 80 μm from the second end surface 119 along the second end surface 119 from the start point is defined as L1. The end point of the line L1 is a position at a distance of 80 μm from the side of the second surface 103' of the blank 100' (or a second surface 203 of the member 200) in the sheet thickness direction and a distance W2=80 μm from the second end surface 119.

In addition, in the cross section of the steel sheet 100 viewed in the width direction, the hardness is measured along the line L2 inside the blank 100' or the member 200. The start point of the line L2 is a position at a distance W1=80 μm from the side of the first surface 101' of the blank 100' (or the first surface 201 of the member 200) in the sheet thickness direction and a distance W3=300 μm from the second end surface 119. The line passing a position of 300 μm from the second end surface 119 along the second end surface 119 from the start point is defined as L2. The end point of the line L2 is a position at a distance of 80 μm from the side of the second surface 103' of the blank 100' (or the second surface 203 of the member 200) in the sheet thickness direction and a distance W3=300 μm from the second end surface 119.

In this case, conditions for measuring the hardness along the line L1 and the line L2 are as follows. On the cut surface of the welded part 115 of the steel sheet 100 exemplified in FIG. 6, a sample including the softened part 120 is collected, and a sample of the measurement surface is prepared, and subjected to a Vickers hardness test. A method of preparing a measurement surface is performed according to JIS Z 2244:2009. After the measurement surface is polished using #600 to #1500 silicon carbide paper, mirror finishing is performed using a liquid in which diamond powder particles having a particle size of 1 μm to 6 μm are dispersed in a diluting solution such as an alcohol or pure water. The Vickers hardness test is performed according to the method described in JIS Z 2244:2009. For the sample for which the measurement surface is prepared, the Vickers hardness is measured using a micro Vickers hardness tester at a test load of 0.98 N and a pitch of 0.1 mm.

The average value of the hardness measurement results along the line L1 in the vicinity of the second end surface 119 is higher than the average value of the hardness measurement results along the line L2 on the inside of the blank 100' or the member 200. Specifically, as an example, the average value of the hardness measurement results along the line L1 in the vicinity of the second end surface 119 is a Vickers hardness of about 217 Hv. In addition, as an example, the average value of the hardness measurement results along the line L2 on the inside of the blank 100' or the member 200 is a Vickers hardness of about 181 Hv. That is, the Vickers hardness in the vicinity of the second end surface 119 (position at a distance W2 of 80 μm from the second end surface 119) is a value that is higher than the Vickers hardness on the inside of the blank 100' or the member 200 (position at a distance W3 of 300 μm from the second end surface 119) by at least 10%.

In this manner, the hardness in the vicinity of the second end surface 119 is set higher than the hardness on the inside of the blank 100' or the member 200. Thereby, after the steel sheet 100 is formed as the blank 100' or the member 200, the strength of the second end surface 119 can be sufficiently maintained, and deformation and fracture starting from the vicinity of the second end surface 119 can be suppressed. As a result, deformation at the second end surface 119 in the production process using the steel sheet 100 and the like are suppressed, the yield is improved, and the productivity including that of the shearing process is improved.

Specifically, an example in which the steel sheet 100 is formed into a member and a member having a hat shape in a cross-sectional view is obtained is exemplified. In addition, an example in which the member is applied as a framework member A pillar or B pillar is exemplified. In addition, the member can be applied as a framework member formed of the steel sheet 100 having the welded part 115.

[Method of Producing Steel Sheet]

Next, with reference to FIG. 7, an example of a method of producing the steel sheet 100 according to the present embodiment will be described. FIG. 7 is a diagram illustrating an example of a method of producing the steel sheet 100 according to the present embodiment. As shown in FIG. 7, first, a high-tensile steel sheet is prepared as the first sheet material 111 and a high-tensile steel sheet is prepared as the second sheet material 113. Subsequently, as a result of welding the first sheet material 111 and the second sheet material 113 by laser welding or the like, the first sheet material 111 and the second sheet material 113 are welded via the welded part 115, and the steel sheet 100 is formed. Subsequently, as a result of softening the steel sheet 100 by laser heating or the like, the softened part 120 is formed in at least a part of the welded part 115. In particular, the softened part 120 is formed so that it includes a part in which the welded part 115 and the scheduled cutting line α intersect. Then, the steel sheet 100 is sheared. That is, a first shearing tool A and a second shearing tool B come in contact with the softened part 120, the part is cut, and the blank 100' having a predetermined shape is cut out from the steel sheet 100. Then, as necessary, the blank 100' is additionally subjected to a cutting process or a forming process, and finally processed into a member having a predetermined shape. The method of producing the steel sheet 100 according to the present embodiment has been described above.

According to the present embodiment, in the steel sheet 100 having the welded part 115, the softened part 120 is formed in at least a part of the welded part 115, and in the first end surface 117 of the steel sheet 100 in which the end part of the welded part 115 is formed, the softened part 120 is not formed at the end part of the welded part 115 in the longitudinal direction, and the maximum value of the depth of the steel sheet 100 in the sheet thickness direction of the softened part 120 is, as a ratio to the sheet thickness of the steel sheet 100, 50% or less. Thereby, the influence of the welded part 115 having a relatively high strength and brittle structure on the shearing tool can be reduced, defects of the shearing tool can be reduced, the burden of maintenance and inspection operations such as shearing tool replacement can be reduced and the formability and collision characteristics of the member after shearing can be sufficiently secured. In addition, in the first end surface 117 of the steel sheet 100, since there is a region in which the softened part 120 is not formed, the strength of the outer peripheral edge surface of the steel sheet 100 is improved. Therefore, after shearing is performed, the shape of the scrap is stable, and the scrap is effectively discharged. As a result, the productivity in the shearing process for the steel sheet 100 is improved.

In addition, according to the present embodiment, in the blank 100' or the member 200 formed from the steel sheet 100 having a first part (for example, a part obtained by shearing the first sheet material 111), a second part (for example, a part obtained by shearing the second sheet material 113), and a welded part in which the first part and the second part are caused to abut in the in-plane direction and welded, a softened part that is softened more than other parts in the welded part is formed in at least a part of the welded part, and there is a region in which the softened part is not formed in at least a part of the end part of the welded part in the longitudinal direction, and hardness in the vicinity of the second end surface 119 is a value that is higher than the hardness on the inside of the blank 100' or the member 200 by at least 10%. Thereby, after the steel sheet 100 is formed as the blank 100' or the member 200, the strength of the second end surface 119 can be sufficiently maintained, and deformation and fracture starting from the vicinity of the second end surface 119 can be suppressed. In addition, according to the softened part 120 formed in the welded part 115 of the steel sheet 100, the productivity including that of the shearing process is improved. The steel sheet 100 according to one embodiment of the present invention has been described above.

MODIFICATION EXAMPLE

Figure 8A:
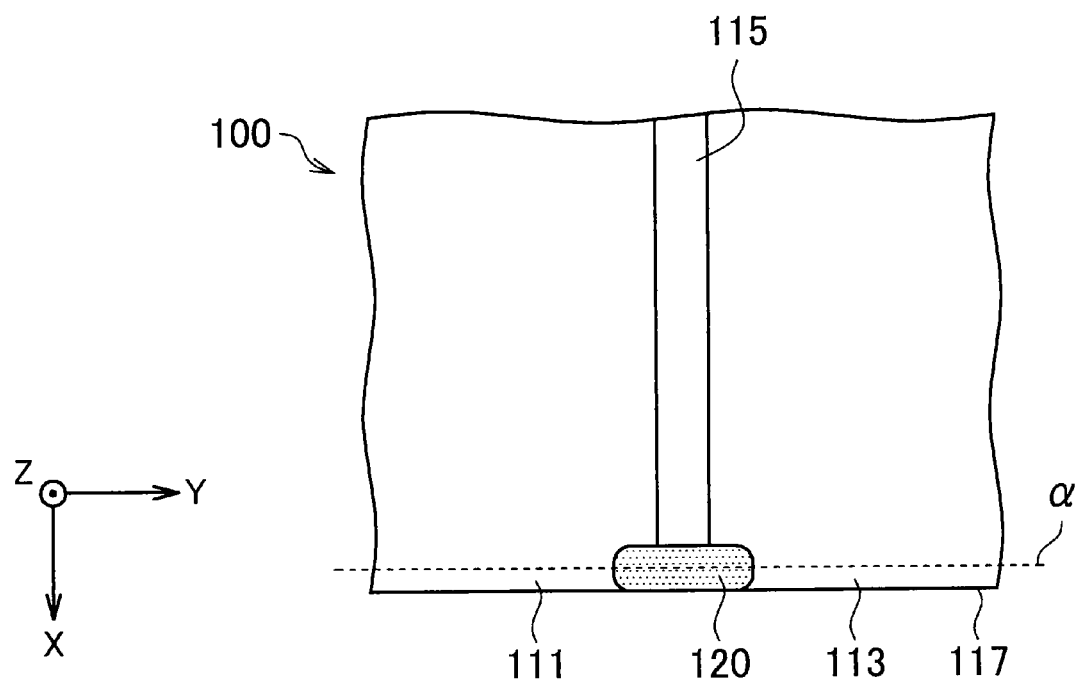
FIG. 8A is a plan view showing another example of the steel sheet according to the same embodiment.

Subsequently, a modification example of the steel sheet 100 according to one embodiment of the present invention will be described with reference to FIG. 8A and FIG. 8B. FIG. 8A is a plan view showing the steel sheet 100 according to the present modification example. FIG. 8B is a side view of the steel sheet 100 according to the present modification example. The present modification example is different from the above embodiment in that, in the first end surface 117 in which the end part of the welded part 115 of the steel sheet 100 is formed, there are a region in which the softened part 120 is formed and a region in which the softened part 120 is not formed. In the description of the present modification example, for content common to the description of the above embodiment, descriptions thereof may be omitted.

As shown in FIG. 8A, in the steel sheet 100 according to the present modification example, the softened part 120 is formed in a part of the welded part 115. In addition, the softened part 120 is formed so that it includes a surface of a part in which the scheduled cutting line a for shearing the steel sheet 100 and the welded part 115 intersect. In addition, a part of the outer edge of the softened part 120 in a plan view extends on the first end surface 117 of the steel sheet 100.

In addition, as shown in FIG. 8B, the end part of the welded part 115 in the longitudinal direction (X direction) is formed on the first end surface 117 of the steel sheet 100. In a side view of the first end surface 117, on the first end surface 117, in at least a part of the part in which the end part of the welded part 115 in the longitudinal direction is formed, there is a region β in which the softened part 120 is not formed. As shown in FIG. 8B, in a side view of the first end surface 117, on the side of the first surface 101, the softened part 120 is formed. On the other hand, in a side view of the first end surface 117, on the side of the second surface 103, there is a region β in which the softened part 120 is not formed. That is, the outer edge of the softened part 120 in the width direction (X direction) reaches the first end surface 117 only on the side of the first surface 101. On the other hand, at the center part in the sheet thickness direction (Z direction) and on the side of the second surface 103, the outer edge of the softened part 120 does not reach the first end surface 117. In this manner, in at least a part of the first end surface 117 in which the end part of the welded part 115 is formed, there is a region β in which the softened part 120 is not formed, and thus the productivity of shearing on the steel sheet 100 is further improved.

That is, when the steel sheet 100 is sheared, the blank 100' is formed and parts other than the blank 100' are scrapes. In the scraps, the first end surface 117 of the steel sheet 100 remains without change. In this case, as described above, if the softened part 120 is formed in the entire region in the sheet thickness direction in a part in which the end part of the welded part 115 is formed within the outer peripheral edge surface of the scrap, it may be difficult to discharge the scrap. That is, since there are many softened parts on the end surface in which the end part of the welded part 115 of the scrap is formed, the shape of the scrap is not stable during shearing or after processing, and a discharge defect after shearing is likely to occur. As a result, the productivity of the shearing process for the steel sheet 100 is lowered because, for example, a separate manual discharging operation is required. Therefore, on the first end surface 117 of the steel sheet 100, in at least a part of the part in which the end part of the welded part 115 in the longitudinal direction is formed, there is a region β in which the softened part 120 is not formed, and thus the scrap is effectively discharged, and improvement in the productivity of the shearing process is realized. The modification example of the steel sheet 100 according to one embodiment of the present invention has been described above.

EXAMPLES

Experimental Example 1

Figure 9A:
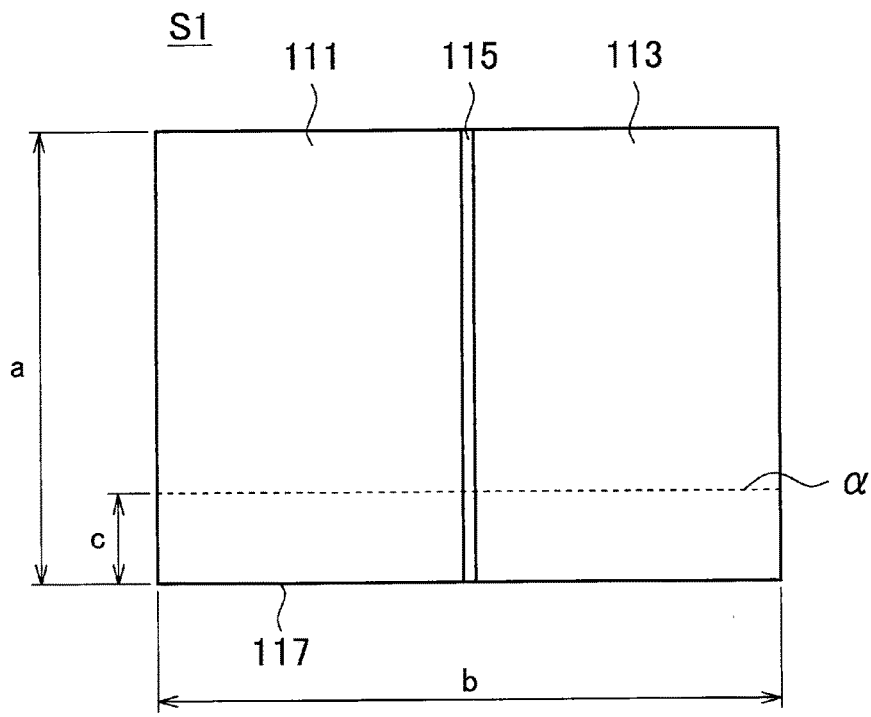
FIG. 9A is a diagram for illustrating a test piece as a comparative example.
Figure 9B:
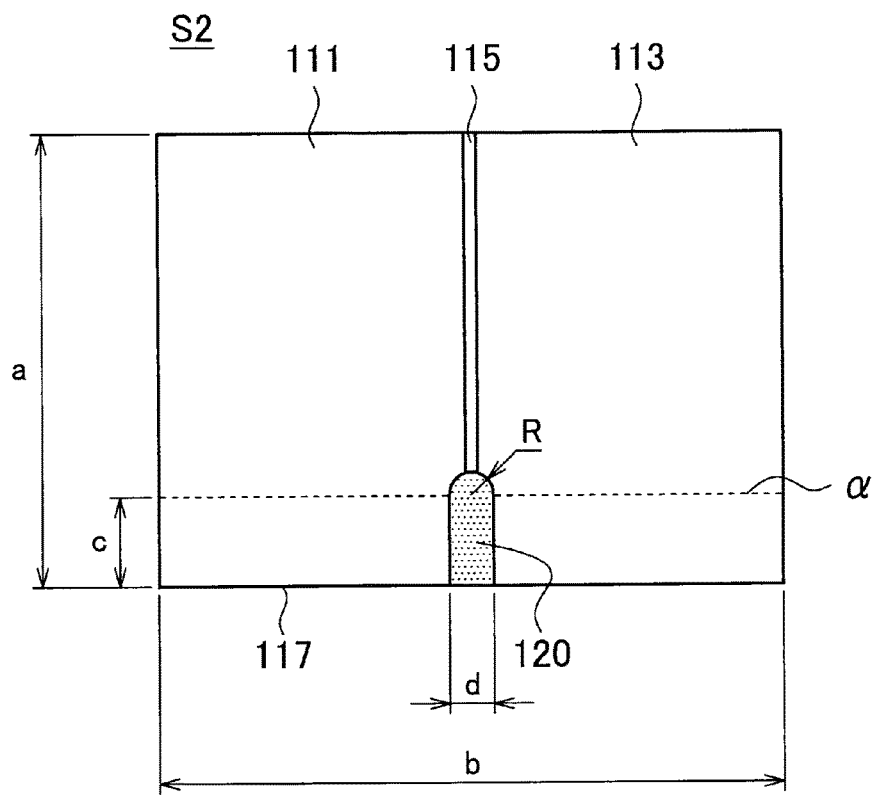
FIG. 9B is a diagram for illustrating a test piece as a comparative example.
Figure 9C:
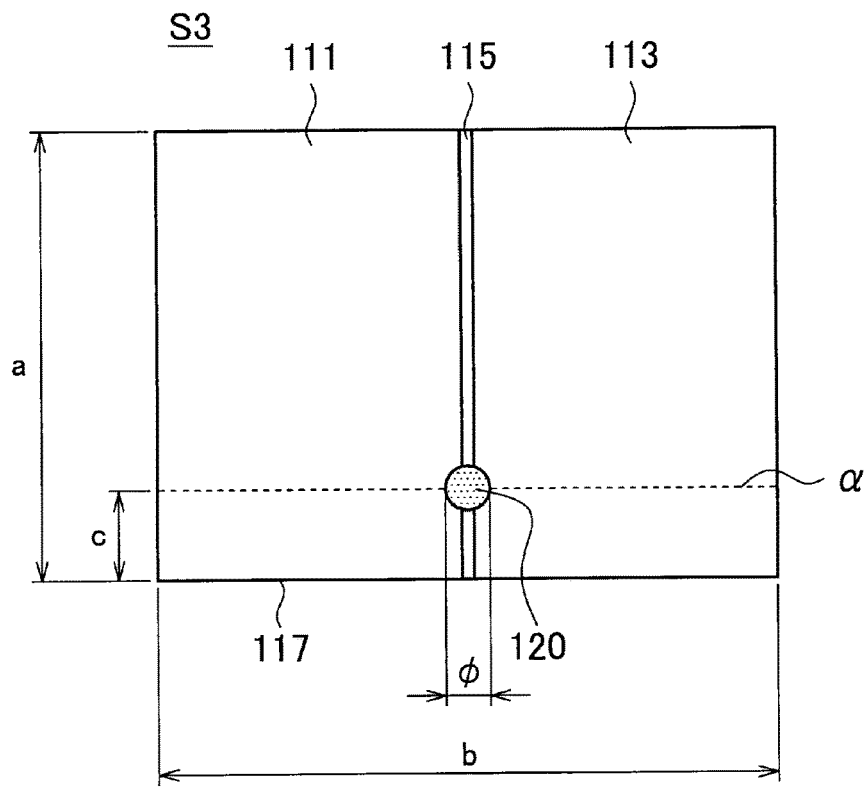
FIG. 9C is a diagram for illustrating a test piece as an example.
Figure 10:
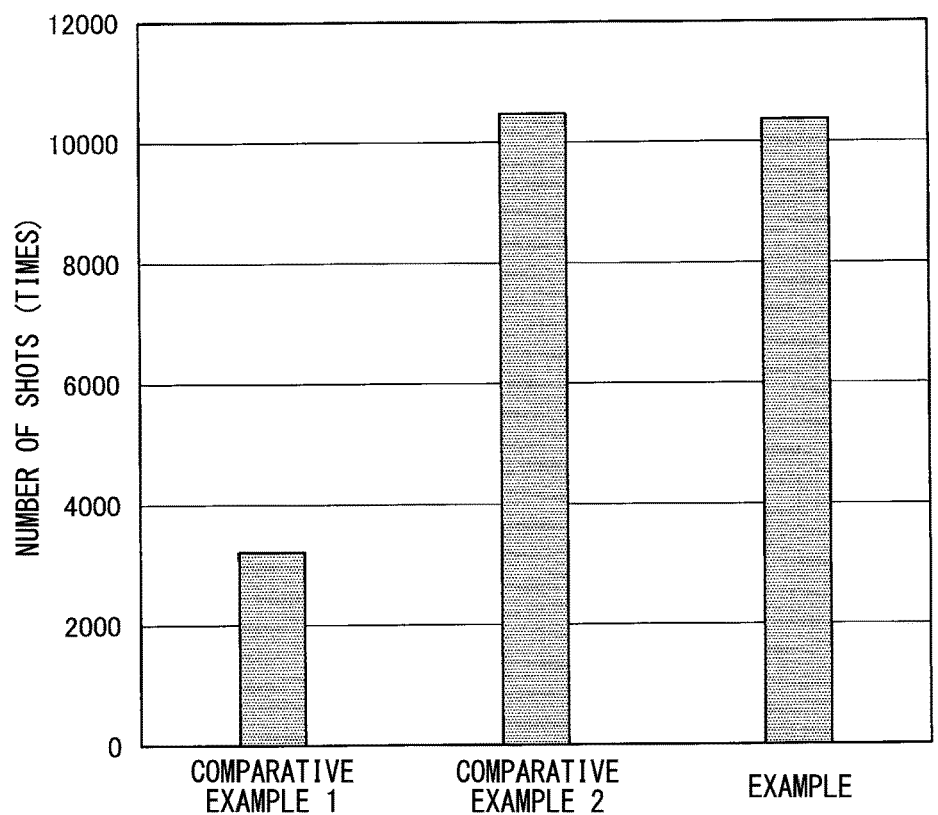
FIG. 10 is a graph showing the number of shots until defects occurs in a shearing tool due to shearing.
Figure 11:
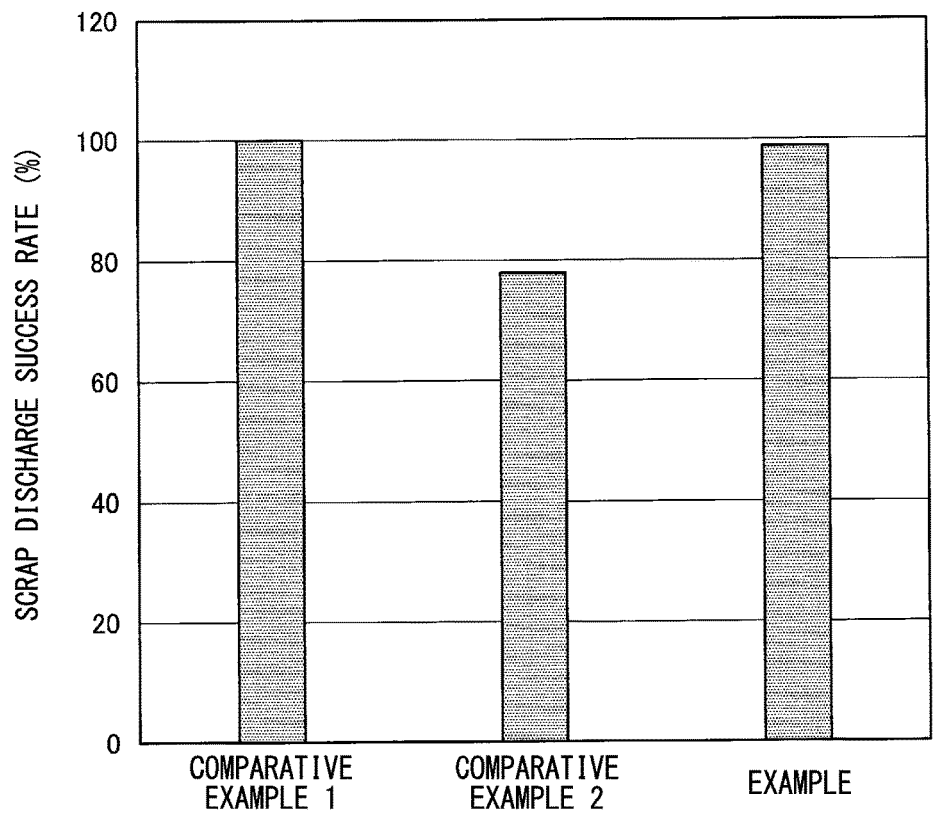
FIG. 11 is a graph showing a scrap discharge success rate after shearing.

In order to evaluate the performance of the steel sheet 100 according to the present embodiment, as an example, a shearing experiment and evaluation were performed with the steel sheet 100 in which the softened part 120 was formed. With reference to FIGS. 9A to 9C, FIG. 10, and FIG. 11, the experiment and the evaluation result will be described. FIGS. 9A and 9B are diagrams for illustrating test pieces S1 and S2 as comparative examples. FIG. 9C is a diagram for illustrating a test piece S3 as an example. FIG. 10 is a graph showing the number of shots until defects occurred in the shearing tool due to shearing. FIG. 11 is a graph showing a scrap discharge success rate after shearing.

As shown in FIGS. 9A to 9C, the test pieces S1 to S3 in a plan view were sheet materials having a rectangular shape. The test pieces S1 to S3 had a size with a width a of 100 mm and a length b of 140 mm. In addition, the scheduled cutting line α was parallel to the first end surface 117 and a distance c from the first end surface 117 was set to 20 mm.

The substance of the first sheet material 111 was a steel material having a tensile strength of 780 MPa grade. In addition, the substance of the second sheet material 113 was a steel material having a tensile strength of 1,180 MPa grade. The first sheet material 111 and the second sheet material 113 both had a sheet thickness of 1.6 mm. The first sheet material 111 and the second sheet material 113 were caused to abut on the end surfaces and welded by laser welding.

In the test piece S2 as Comparative Example 2, the softened part 120 was formed by laser heating from the position at which the welded part 115 and the scheduled cutting line α intersected to the first end surface 117. The softened part 120 in a plan view had a rounded square shape extending in the extension direction of the welded part 115. The round part had a semicircular shape with a radius R of 5 mm. The softened part 120 in a side view was formed over the entire region in the sheet thickness direction on the end surface of the first end surface 117. The width d of the softened part 120 was 10 mm.

In the test piece S3 as an example, the softened part 120 was formed by laser heating at a position at which the welded part 115 and the scheduled cutting line α intersected. The softened part 120 in a plan view had a circular shape with a diameter φ of 10 mm.

In shearing conditions, the punching clearance was set to 10% of the sheet thickness of the test pieces S1 to S3. The test pieces S1 to S3 corresponded to Comparative Example 1, Comparative Example 2 and an example to be described below.

As shown in FIG. 10, in Comparative Example 1 having no softened part 120, defects occurred in the shearing tool by shearing with the number of shots of about 3,000. On the other hand, in Comparative Example 2 and the example having the softened part 120, defects occurred in the shearing tool with the number of shots of about 10,000.

As shown in FIG. 11, in Comparative Example 1 in which the softened part 120 was not formed, the scrap discharge success rate after shearing was about 100%. On the other hand, in Comparative Example 2 in which the softened part 120 was formed over the entire region of the first end surface 117 in the sheet thickness direction, the scrap discharge success rate was about 80%. In addition, in the example in which the softened part 120 was formed and the softened part 120 was not formed in the entire region of the first end surface 117 in the sheet thickness direction, the scrap discharge success rate was about 100%.

Experimental Example 2

In order to evaluate the performance of the steel sheet according to the present embodiment, the maximum value of the depth of the softened part in the sheet thickness direction with respect to the steel sheet in the sheet thickness was changed, and evaluation was performed according to the shearing and the tensile test.

The test piece had a size with a width a of 100 mm and a length b of 140 mm. The substance of the first sheet material was a steel material having a tensile strength of 780 MPa grade. In addition, the substance of the second sheet material was a steel material having a tensile strength of 1,180 MPa grade. The first sheet material and the second sheet material both had a sheet thickness of 1.6 mm. The first sheet material and the second sheet material were caused to abut on the end surfaces and welded by laser welding.

On each test piece, the softened part was formed by laser heating at a position at which the welded part and the scheduled cutting line α intersected. Test pieces in which the maximum value of the depth of the softened part in the sheet thickness direction with respect to the sheet thickness of the steel sheet differed by 10% from 10% to 100% were prepared. In addition, a test piece in which no softened part was formed was also prepared.

In shearing conditions, the punching clearance was set to 10% of the sheet thickness of the test piece. In the same manner as in Experimental Example 1, in each test piece, the number of shots until the tool was damaged was measured.

In addition, each test piece was cut out into the shape of a JIS No. 5 test piece. The welded part was positioned at the center of the JIS No. 5 test piece in the tensile direction and the longitudinal direction and the tensile direction of the welded part were orthogonal to each other. Then, the tensile test was performed according to the method described in ISO 6892. According to the tensile test, the breaking elongation of each test piece was measured, and the breaking elongation (breaking elongation after the heat treatment) of each test piece in which the softened part was formed with respect to the breaking elongation before the heat treatment (breaking elongation of the test piece in which no softened part was formed) was calculated.

Figure 12:
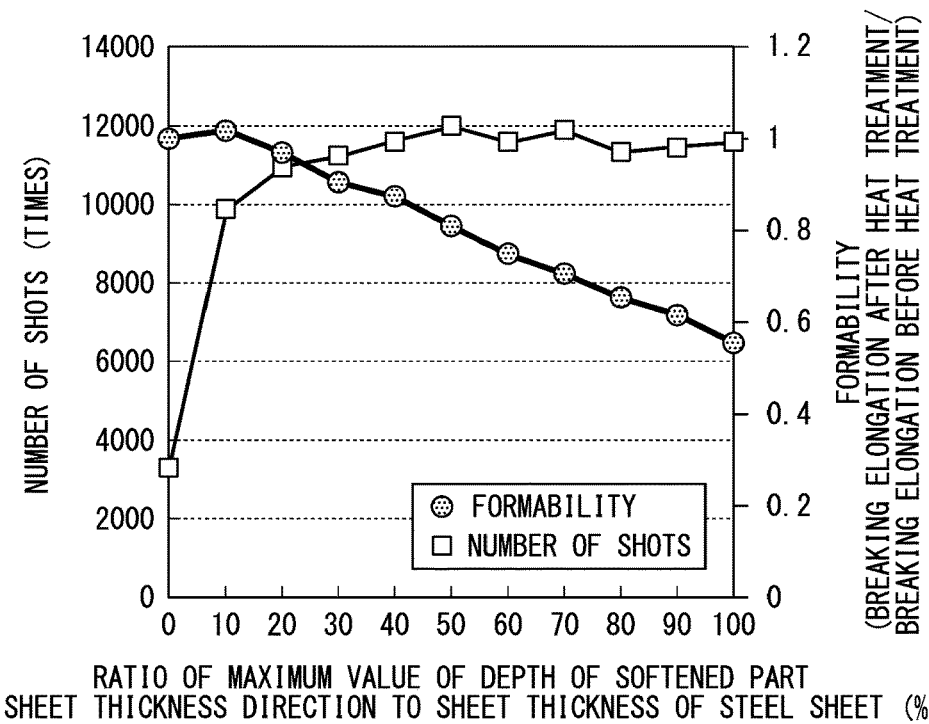
FIG. 12 is a graph showing the number of shots until tool damage occurred and the formability with respect to a maximum value of a depth of a softened part in a sheet thickness direction.

FIG. 12 shows the number of shots until the tool was damaged and the formability with respect to the maximum value of the depth of the softened part in the sheet thickness direction. In the graph in FIG. 12, the horizontal axis represents the maximum value (%) of the depth of the softened part in the sheet thickness direction and the vertical axis represents the number of shots (times) until the tool was damaged and the formability (breaking elongation after the heat treatment/breaking elongation before the heat treatment). Square plots indicate the number of shots and round plots indicate the formability.

[Number of Shots]

As shown in FIG. 12, in the test piece having no softened part, defects occurred in the shearing tool by shearing with the number of shots of about 3,000. On the other hand, in the test piece having a softened part of 10% or more, the number of shots until defects occurred in the shearing tool exceeded about 10,000. That is, it can be understood that defects of the tool were reduced by forming an appropriate softened part in the welded part. Here, when the maximum value of the depth of the softened part in the sheet thickness direction with respect to the steel sheet in the sheet thickness exceeded 50%, no clear difference was observed in the number of shots.

[Formability]

In the vicinity of the welded part, there was a HAZ softened region having a lower hardness than a base material. Since such a HAZ softened region had a relatively low hardness, strain due to deformation was likely to be concentrated, and the region was likely to be a starting point of breakage. When the heat treatment is performed to form a softened part in the welded part, the HAZ softened region was additionally softened. That is, when a steel sheet having a large region of the softened part formed in the welded part was deformed, breakage in the HAZ softened region was more likely to occur.

Based on the result of this experimental example, it can be understood that, when the maximum value of the depth of the softened part in the sheet thickness direction with respect to the steel sheet in the sheet thickness was 50% or less, the formability (breaking elongation after the heat treatment/breaking elongation before the heat treatment) based on the test piece in which no softened part was formed was 0.8 or more. When the formability was within this range, it was possible to sufficiently secure the formability and collision characteristics of the member. However, it can be understood that, when the maximum value of the depth of the softened part in the sheet thickness direction with respect to the steel sheet in the sheet thickness exceeded 50%, the formability deteriorated. This is thought to be caused by the fact that the above HAZ softened region was additionally softened.

Based on the results of this experimental example, it can be understood that, in order to avoid breakage in the HAZ softened region, it was desirable to adjust heat treatment conditions and set the maximum value of the depth of the softened part in the sheet thickness direction to be a predetermined value or less.

In this manner, according to Experimental Example 1, it was shown that, when the softened part was provided, defects of the shearing tool were reduced. In addition, it was found that, in a side view of the first end surface of the steel sheet when the softened part was not formed over the entire region in the sheet thickness direction, the scrap discharge success rate was improved. Therefore, according to Experimental Example 1, it was found that, in the shearing process of the steel sheet according to the present embodiment, since the scrap discharge success rate was improved while reducing defects of the shearing tool, the productivity of the shearing process was further improved.

In addition, according to Experimental Example 2, when the maximum value of the depth of the softened part in the sheet thickness direction with respect to the steel sheet in the sheet thickness was 50% or less, the number of shots until the tool was damaged increased, but when the maximum value of the depth of the softened part in the sheet thickness direction with respect to the steel sheet in the sheet thickness exceeded 50%, no significant change was observed. In addition, in order to secure the formability and collision characteristics of the member, it was important to inhibit softening of the HAZ softened region. Based on the results of Experimental Example 2, it can be understood that, in the steel sheet of the present invention, when the maximum value of the depth of the softened part in the sheet thickness direction with respect to the steel sheet in the sheet thickness was 50% or less, it was possible to sufficiently secure the formability and collision characteristics of the member while reducing damage on the tool.

While preferable embodiments of the present invention have been described above in detail with reference to the appended drawings, the present invention is not limited to these examples. It can be clearly understood by any person with ordinary knowledge in the field of technology to which the present invention belongs that various alternations or modifications can be made within the scope of the technical idea described in the scope of the claims, and these also naturally belong to the technical scope of the present invention.

For example, in the above embodiment, the welded part 115 had a straight strip shape in a plan view of the steel sheet 100, but the present invention is not limited to such an example. For example, in a plan view of the steel sheet 100, the welded part 115 may have a zigzag shape or a curved shape.

INDUSTRIAL APPLICABILITY

Since the present invention can provide a novel and improved steel sheet and member that can improve productivity including that of a shearing process for a welded steel sheet, it is industrially useful.

BRIEF DESCRIPTION OF THE REFERENCE SYMBOLS

100 Steel sheet
101 First surface
103 Second surface
111 First sheet material
113 Second sheet material
115 Welded part
117 First end surface
119 Second end surface
120 Softened part
200 Member

The invention claimed is:

1. A steel sheet formed by causing end surfaces of a first sheet material and a second sheet material to abut each other in an in-plane direction and welding the first sheet material and the second sheet material via a strip-shaped welded part,
wherein a softened part that is softened more than other parts in the welded part is formed in at least a part of the welded part,
wherein, on a first end surface of the steel sheet in which an end part of the welded part in a longitudinal direction is formed, a region in which the softened part is not formed is provided in at least a part of the end part of the welded part in the longitudinal direction, and
wherein a maximum value of a depth of the softened part in a sheet thickness direction is, as a ratio to a sheet thickness of the steel sheet, 50% or less.

2. The steel sheet according to claim 1,
wherein at least one of the first sheet material and the second sheet material is a steel material having a tensile strength of 1,180 MPa or more.

3. The steel sheet according to claim 1,
wherein at least one of the first sheet material and the second sheet material is a steel material having a tensile strength of 1,310 MPa or more.

4. The steel sheet according to claim 1,
wherein a Vickers hardness of the softened part is 90% or less with respect to a Vickers hardness of other parts in the welded part.

5. The steel sheet according to claim 1,
wherein the maximum value of the depth of the softened part in the sheet thickness direction is, as a ratio to a sheet thickness of the steel sheet, 30% or less.

6. The steel sheet according to claim 1,
wherein the maximum value of the depth of the softened part in the sheet thickness direction is, as a ratio to a sheet thickness of the steel sheet, 10% or less.

7. The steel sheet according to claim 1,
wherein the softened part is provided on a side of a first surface of the steel sheet and on a side of a second surface opposite to the first surface.

8. The steel sheet according to claim 7,
wherein the softened part is provided side by side with each other, and
wherein a first position at which the depth of the softened part provided on the side of the first surface of the steel sheet in the sheet thickness direction is a maximum and a second position at which the depth of the softened part provided on the side of the second surface of the steel sheet in the sheet thickness direction is a maximum are different from each other in a direction orthogonal to the sheet thickness direction of the softened part on a sheet surface of the steel sheet.

9. A member, comprising:
a first part;
a second part; and
a welded part in which the first part and the second part are caused to abut in an in-plane direction and welded,
wherein a softened part that is softened more than other parts in the welded part is formed in at least a part of the welded part,
wherein a region in which the softened part is not formed is provided in at least a part of an end part of the welded part of the member in a longitudinal direction, and
wherein, on a second end surface in which an end part of the welded part in the longitudinal direction is formed, an average value of Vickers hardnesses at a distance of 80 μm from the second end surface is a value that is higher than an average value of Vickers hardnesses at a distance of 300 μm from the second end surface by at least 10%.

* * * * *